(12) United States Patent
Lu

(10) Patent No.: US 10,815,962 B1
(45) Date of Patent: Oct. 27, 2020

(54) LIQUID-FILLED HYDROELECTRIC GENERATION DEVICE

(71) Applicants: Shun-Tsung Lu, Taichung (TW); Ta-Wei Lu, Taichung (TW)

(72) Inventor: Shun-Tsung Lu, Taichung (TW)

(73) Assignees: Shun-Tsung Lu, Taichung (TW); Ta-Wei Lu, Taichung (TW)

( * ) Notice: Subject to any disclaimer, the term of this patent is extended or adjusted under 35 U.S.C. 154(b) by 0 days.

(21) Appl. No.: 16/549,108

(22) Filed: Aug. 23, 2019

(51) Int. Cl.
*F03B 17/06* (2006.01)
*H02K 7/18* (2006.01)
*F03B 3/12* (2006.01)
*F03B 15/02* (2006.01)
*E02B 9/02* (2006.01)

(52) U.S. Cl.
CPC ............ *F03B 17/06* (2013.01); *E02B 9/02* (2013.01); *F03B 3/121* (2013.01); *F03B 15/02* (2013.01); *H02K 7/1823* (2013.01); *F05B 2220/706* (2013.01); *F05B 2240/40* (2013.01)

(58) Field of Classification Search
CPC .......... F03B 3/121; F03B 15/02; F03B 17/06; E02B 9/02; H02K 7/1823; F05B 2220/706; F05B 2240/40
USPC ................ 290/43, 52, 53, 54; 60/325, 398
See application file for complete search history.

(56) References Cited

U.S. PATENT DOCUMENTS

| | | | | | |
|---|---|---|---|---|---|
| 120,545 | A | * | 10/1871 | Stevens | F03B 17/00 60/325 |
| 995,219 | A | * | 6/1911 | Bradley | F24S 20/20 60/641.8 |
| 1,000,345 | A | * | 8/1911 | Roed | F04F 5/08 417/150 |
| 1,290,756 | A | * | 1/1919 | Kasley | F02G 1/043 60/526 |
| 1,356,463 | A | * | 10/1920 | Okun | F03B 17/005 60/325 |
| 2,887,956 | A | * | 5/1959 | Kunkel | F04F 7/02 417/148 |
| 3,611,723 | A | * | 10/1971 | Theis, Jr. | F03B 17/005 60/327 |
| 3,810,717 | A | * | 5/1974 | Rakcevic | F03B 13/06 417/323 |
| 4,052,858 | A | * | 10/1977 | Jeppson | F01K 17/04 60/648 |
| 4,220,003 | A | * | 9/1980 | Doi | F03B 17/025 185/27 |
| 4,258,269 | A | * | 3/1981 | Tsubota | F03B 13/22 290/42 |

(Continued)

*Primary Examiner* — Pedro J Cuevas
(74) *Attorney, Agent, or Firm* — Withrow & Terranova, P.L.L.C.; Vincent K. Gustafson (57) ABSTRACT

A hydroelectric generation device has a main channel, at least one branch channel, at least one storage unit, and at least one generator set. The at least one storage unit is mounted in the at least one branch channel, and each storage unit has a container. The at least one generator set is mounted respectively in the at least one storage unit, and each generator set has a generating tube, at least one connection pipe, and a generating unit. The generating tube is mounted in the container. The at least one connection pipe is connected with the generating tube and is bent into an inverted L shape. The generating unit has at least one blade wheel assembly mounted rotatably in the generating tube.

10 Claims, 7 Drawing Sheets

(56) References Cited

U.S. PATENT DOCUMENTS

| | | | | |
|---|---|---|---|---|
| 4,674,279 A * | 6/1987 | Ali | F03B 15/14 | 290/43 |
| 4,767,938 A * | 8/1988 | Bervig | F03B 17/005 | 290/1 R |
| 5,135,684 A * | 8/1992 | Mohn | B01F 3/0876 | 261/76 |
| 5,281,856 A * | 1/1994 | Kenderi | F03B 17/061 | 290/43 |
| 5,461,858 A * | 10/1995 | Johnson | F01K 27/005 | 60/325 |
| 5,551,237 A * | 9/1996 | Johnson | F01K 27/005 | 126/672 |
| 5,713,202 A * | 2/1998 | Johnson | F01K 27/005 | 417/381 |
| 6,114,773 A * | 9/2000 | Kouris | F03B 13/105 | 290/52 |
| 6,396,162 B1 * | 5/2002 | Carrillo | F03B 13/08 | 290/43 |
| 6,420,794 B1 * | 7/2002 | Cao | F03B 17/005 | 290/43 |
| 6,546,723 B1 * | 4/2003 | Watten | F03B 13/00 | 60/398 |
| 7,084,521 B1 * | 8/2006 | Martin | F03B 13/086 | 290/50 |
| 7,377,492 B2 * | 5/2008 | Vrana | B01D 19/0042 | 261/29 |
| 7,969,029 B2 * | 6/2011 | Vitagliano | F03B 17/04 | 290/1 R |
| 8,177,477 B2 * | 5/2012 | Lyatkher | F03B 13/10 | 415/3.1 |
| 8,424,300 B1 * | 4/2013 | Navarro | F03B 13/22 | 60/398 |
| 8,581,430 B2 * | 11/2013 | Shifrin | F03B 15/16 | 290/52 |
| 8,643,206 B2 * | 2/2014 | Ekern | F03B 13/264 | 290/53 |
| 8,648,487 B2 * | 2/2014 | Rutschmann | E02B 9/022 | 290/54 |
| 9,109,571 B2 * | 8/2015 | Sepp | E02B 7/44 | |
| 9,803,614 B2 * | 10/2017 | Williams | F03B 13/08 | |
| 10,202,960 B2 * | 2/2019 | Williams | F03B 13/08 | |
| 10,428,786 B2 * | 10/2019 | Navarro | F16D 31/02 | |
| 2003/0066289 A1 * | 4/2003 | Watten | F03B 13/00 | 60/398 |
| 2003/0192308 A1 * | 10/2003 | Hastings | F03B 13/268 | 60/398 |
| 2004/0088971 A1 * | 5/2004 | Mishnayot | F03G 7/10 | 60/398 |
| 2007/0193956 A1 * | 8/2007 | Nelson | B01D 21/0012 | 210/703 |
| 2009/0085356 A1 * | 4/2009 | Lyatkher | F03B 15/02 | 290/52 |
| 2012/0019004 A1 * | 1/2012 | Ekern | F03B 17/063 | 290/53 |
| 2013/0089410 A1 * | 4/2013 | Azar | F03B 7/003 | 415/151 |

* cited by examiner

LIQUID-FILLED HYDROELECTRIC GENERATION DEVICE

BACKGROUND OF THE INVENTION

1. Field of the Invention

The present invention relates to a generation device, and more particularly to a liquid-filled hydroelectric generation device which can adjust the flow rate for generating electric power by controlling gates of the generation device.

2. Description of Related Art

Hydropower is a conventional way for generating electric power, such as using tides of ocean or water flow in a river. However, the conventional run-of-river hydropower system can generate electric power with a volume of water flowing through. The water flow in a river may change with seasons or weathers, so the generating efficiency of the conventional hydropower system is unstable and is affected by climate and seasons.

To overcome the shortcomings, the present invention tends to provide a hydroelectric generation device to mitigate or obviate the aforementioned problems.

SUMMARY OF THE INVENTION

The main objective of the invention is to provide a hydroelectric generation device which can generate power stably regardless of the flow rate of the water source, and the generating efficiency of the liquid-filled hydroelectric generation device is improved.

The hydroelectric generation device has a main channel, at least one branch channel, at least one storage unit, and at least one generator set. The main channel has a first opening, a second opening, and a main gate. The main gate is mounted in the second opening to selectively open or close the second opening. The at least one branch channel communicates with the main channel, and each one of the at least one branch channel has a first passage, a second passage, a first passage gate, and a second passage gate. The first passage communicates with the main channel. The first passage gate is mounted in the first passage to selectively open or close the first passage. The second passage gate is mounted in the second passage to selectively open or close the second passage. The at least one storage unit is mounted in the at least one branch channel, and each one of the at least one storage unit has a container and an inlet pipe. The inlet pipe has a first end and a second end. The first end is connected and communicates with one of the at least one branch channel. The second end is connected and communicates with the container. The first end of the inlet pipe is higher than the second end of the inlet pipe. The at least one generator set is mounted respectively in the at least one storage unit, and each one of the at least one generator set has a generating tube, at least one connection pipe, and a generating unit. The generating tube is mounted in the container of a corresponding one of the at least one storage unit and has a closed end and an open end. The closed end is formed on a top of the generating tube and is located at a position near a top of the container of the corresponding storage unit. The open end is formed on a bottom of the generating tube. The at least one connection pipe is connected with the generating tube, is bent into an inverted L shape, and has a top end and a bottom end. The top end is connected to the generating tube at a position adjacent to the top of the generating tube. The bottom end is spaced from a bottom of the container of the corresponding storage unit. The generating unit has at least one blade wheel assembly mounted rotatably in the generating tube.

Other objects, advantages and novel features of the invention will become more apparent from the following detailed description when taken in conjunction with the accompanying drawings.

BRIEF DESCRIPTION OF THE DRAWINGS

FIG. 2 is an operational top view of the hydroelectric generation device in

FIG. 1;

DETAILED DESCRIPTION OF PREFERRED EMBODIMENT

Figure 1:
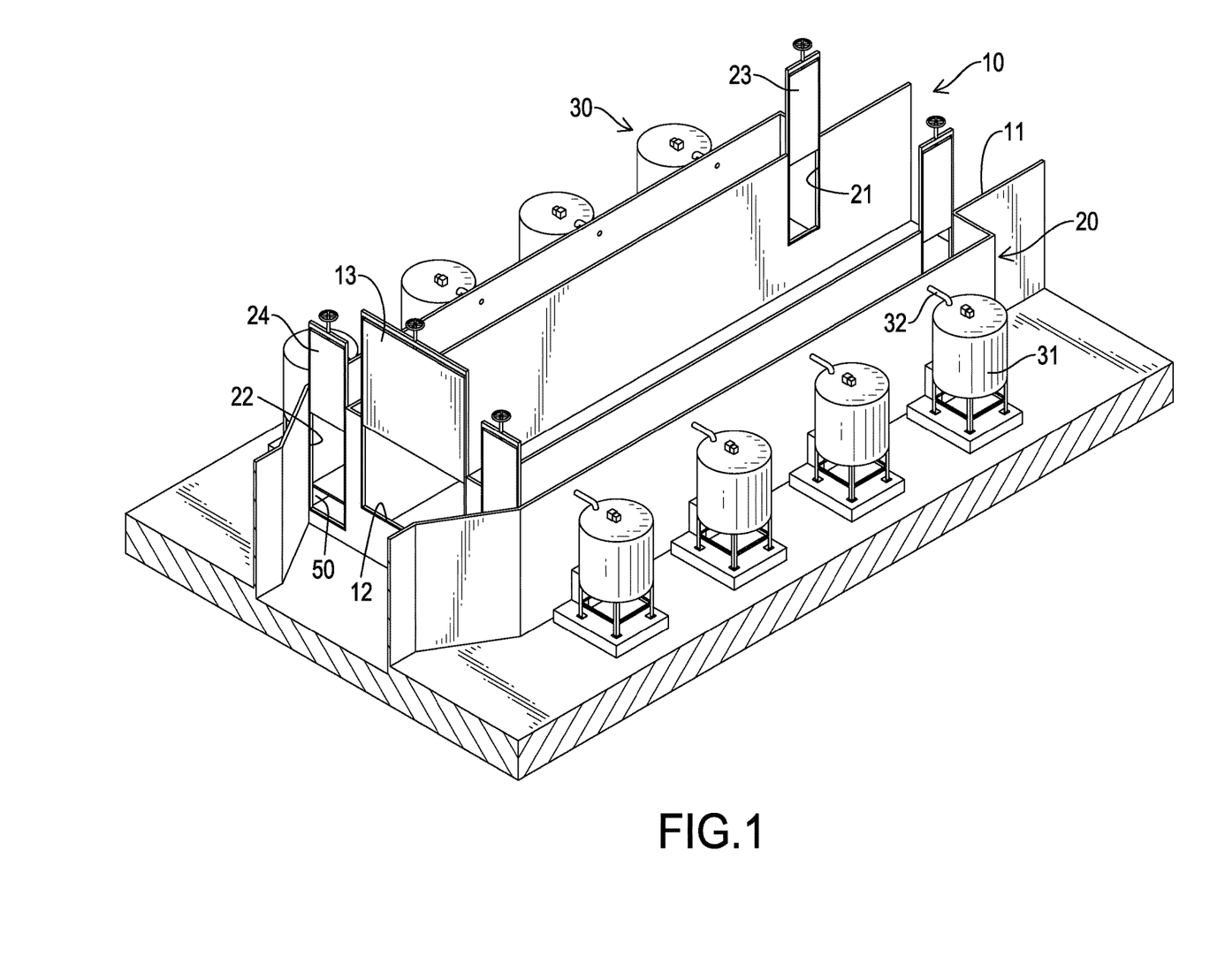
FIG. 1 is a perspective view of a hydroelectric generation device in accordance with the present invention.
Figure 2:
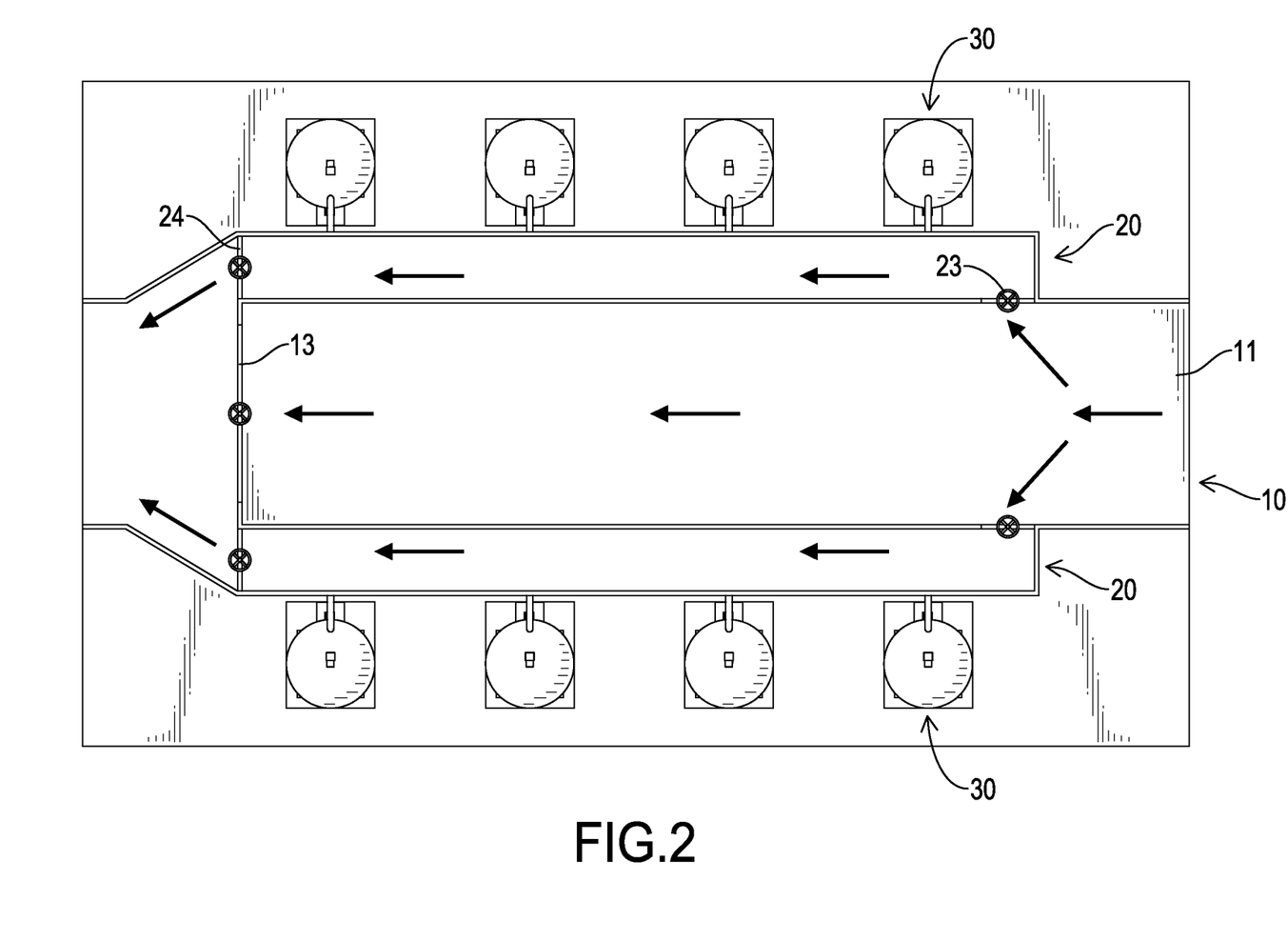
Figure 3:
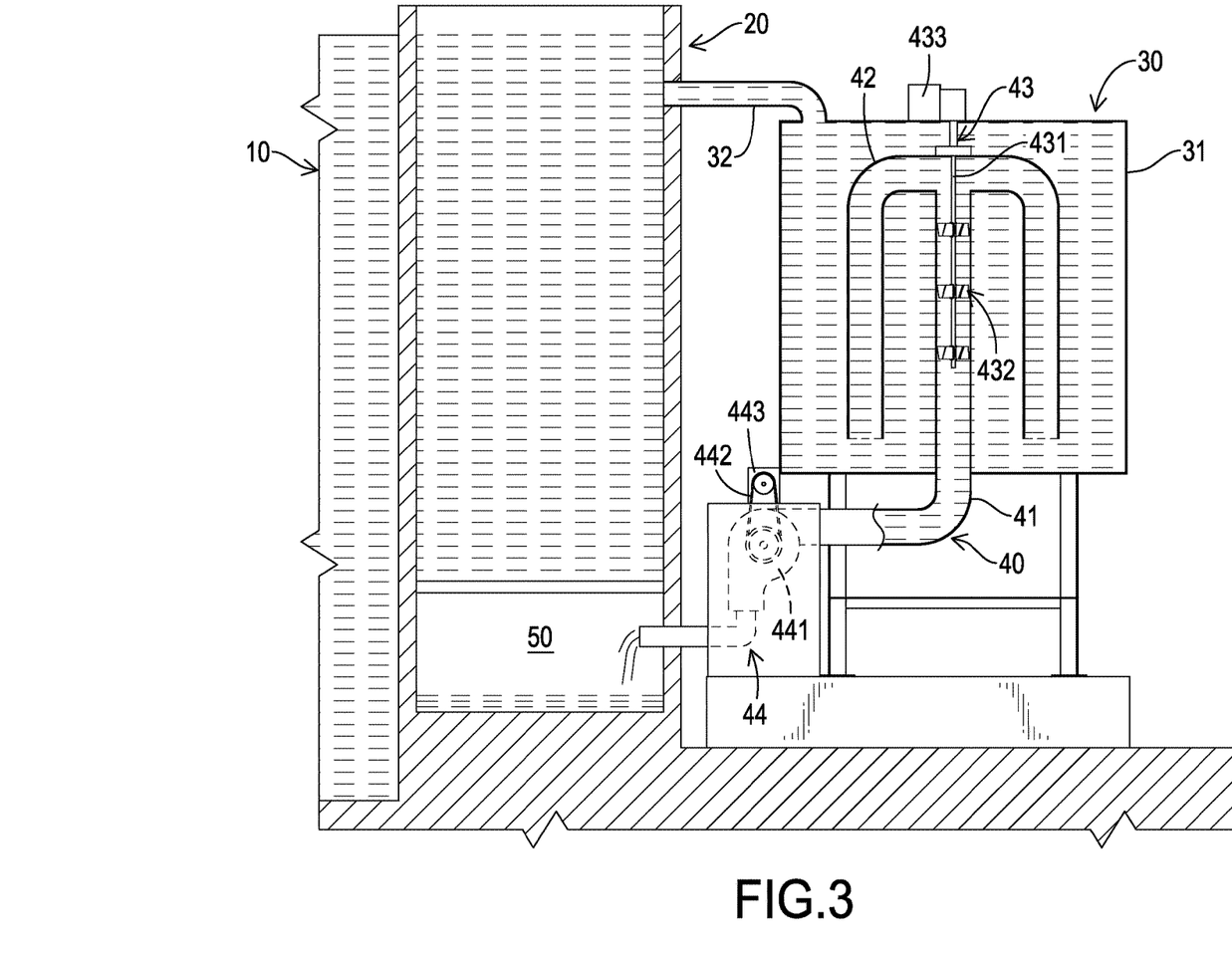
FIG. 3 is an enlarged operational side view in partial section of the hydroelectric generation device in FIG. 1.

With reference to FIGS. 1 to 3, a hydroelectric generation device in accordance with the present invention can be installed in a river and comprises a main channel 10, two branch channels 20, multiple storage units 30, multiple generator sets 40, and two connective channels 50.

The main channel 10 has a first opening 11 and a second opening 12. The first opening 11 is located at an upstream relative to the second opening 12, such that water in the river can flow into the main channel 10 via the first opening 11 and out of the main channel 10 into the river again via the second opening 12. A main gate 13 is mounted in the second opening 12 to selectively close or open the second opening 12.

The branch channels 20 are located respectively at two sides of the main channel 10, and are arranged in the river at positions adjacent to river banks of the river. Each branch channel 20 has a first passage 21 and a second passage 22. The first passage 21 is located at an upstream relative to the second passage 22. The first passage 21 communicates with the main channel 10, such that water can flow from the main channel 10 into the branch channel 20 via the first passage 21. A first passage gate 23 is mounted in the first passage 21 to selectively open or close the first passage 21. In addition, a net is mounted in the first passage 21 to keep objects in the water from entering the branch channel 20. The second passage 22 is located at a position adjacent to the main gate 13, and water in the branch channel 20 can flow into the river again via the second passage 22. A second passage gate 24 is mounted in the second passage 22 to selectively open or close the second passage 22.

The storage units 30 are arranged on the river banks of the river and are located at positions adjacent to the branch channels 20. Each storage unit 30 comprises a container 31 and an inlet pipe 32. The container 31 may be formed as a barrel, a box, a tank, and so on. The inlet pipe is connected and communicates with one of the branch channels 20 and the container 31. The inlet pipe has a first end and a second end. The first end is connected and communicates with one of the at least one branch channel 20. The second end is connected and communicates with the container 31. The first end of the inlet pipe 32 is higher than the second end of the inlet pipe 32.

The generator sets 40 are mounted respectively in the storage units 30. Each generator set 40 comprises a generating tube 41, two connection pipes 42, a generating unit, and a waterwheel generator assembly 44.

The generating tube 41 is mounted in the container 31 and has a closed end and an open end. The closed end is formed on a top of the generating tube 41, is located at a position near a top of the container 31, and may be spaced from the top of the container 31 at a spaced interval. The open end is formed on a bottom of the generating tube 41 and extends out of the bottom of the container 31. The connection pipes 42 are connected with the generating tube 41 and are bent into an inverted L shape, and each connection pipe 42 has a top end and a bottom end. The top end is connected to the generating tube 41 at a position adjacent to the top of the generating tube 41. The bottom end is spaced from the bottom of the container 31 at a spaced interval.

The generating unit 43 comprises a driving shaft 431, three blade wheel assemblies 432, and a generator 433. The driving shaft 431 is mounted in the generating tube 41 and has a top end extending out of the top of the generating tube 41 and the top of the container 31.

Figure 4:
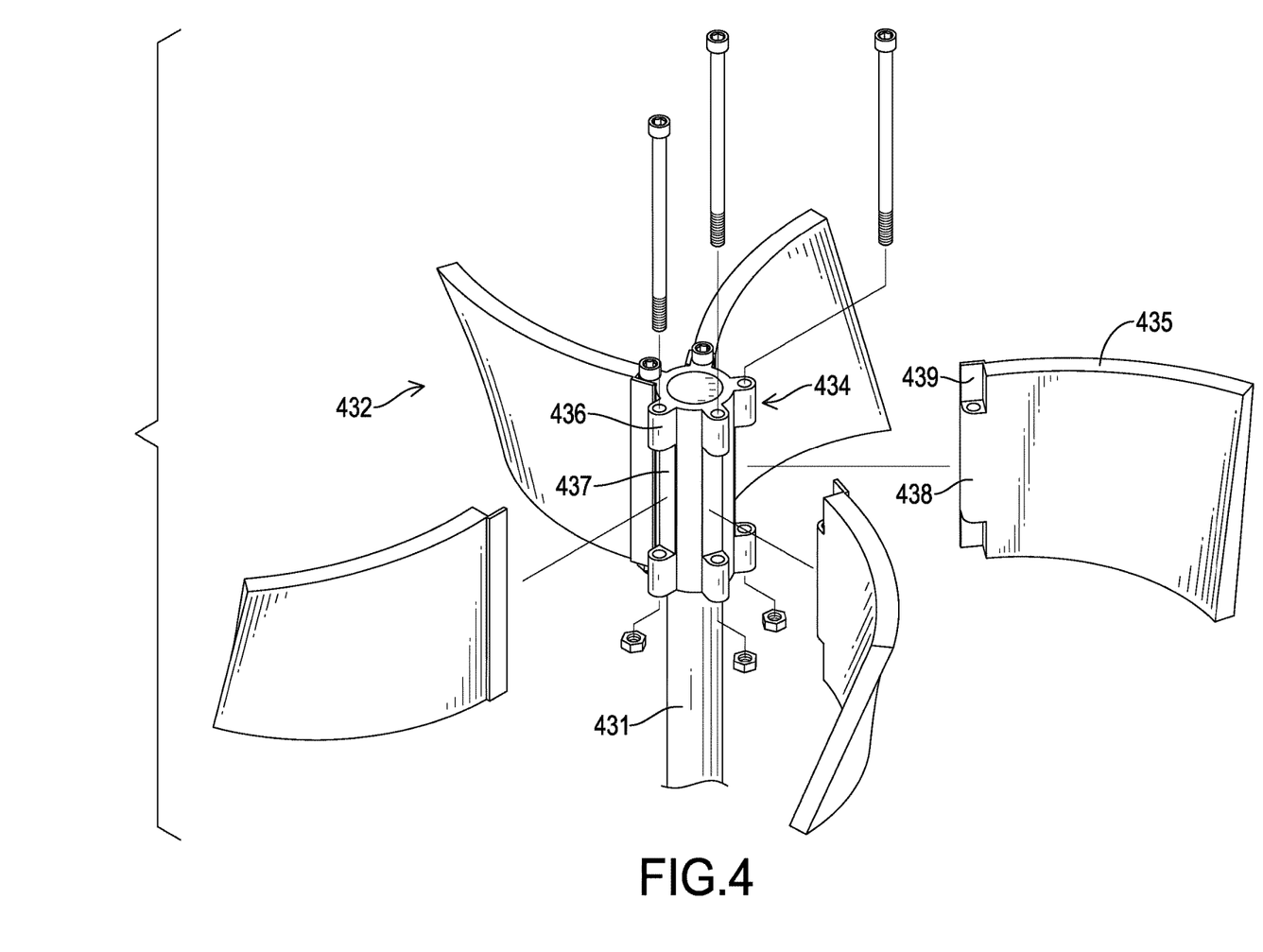
FIG. 4 is an exploded perspective view of a blade wheel assembly of the hydroelectric generation device in FIG. 1.

With reference to FIGS. 3 and 4, the blade wheel assemblies 432 are mounted around the driving shaft 431. Each blade wheel assembly 432 has a sleeve 434 and multiple blades 435. The sleeve 434 is fixed around the driving shaft 431. The sleeve 434 has multiple holders 436 protruding radially from the outer surface of the sleeve 434. The holders 436 extend longitudinally and are arranged around the sleeve 434 at equiangular intervals. Each holder 436 has a pivoting cavity 437 defined in the holder 436. Each blade 435 is connected pivotally to the sleeve 434 in a unidirectional deflection. Each blade 435 has a pivoting portion 438 formed as a hollow cylinder, protruding from an end of the blade 435, and mounted in the pivoting cavity 437 of a respective one of the holders 434. The end of each blade 435 has an abutting plate 439 protruding therefrom and abutting against a side of a respective one of the holders 434. The blade 435 is connected pivotally to the holder 434 with a pivot inserted through the holder 434 and the pivoting portion 438 of the blade 435.

The generator 433 is connected to the top end of the driving shaft 431 and is located outside the container 31.

The waterwheel generator assembly 44 is located outside the container 31 and comprises a waterwheel assembly 441, a transmission element 442, and a generator 443. The waterwheel assembly 441 is mounted rotatably in the generating tube 41. The transmission element 442 is connected with the waterwheel assembly 441. The generator 443 is located outside the generating tube 41, is connected with the transmission element 442 and is driven by the waterwheel assembly 441 to generate electric power.

Preferably, multiple generator sets 40 can be mounted in each storage unit 30, and only one connection pipe 42 can be arranged to connect with the generating tube 41. The amount of the blade wheel assemblies of each generating set can be changed based on different demands.

In addition, only one of the generating units 43 and the waterwheel generator assembly 44 can be implemented in each generator set 40, or other types of hydraulic generators can be disposed in each generator set 40.

With reference to FIGS. 1 and 3, the collective channels 50 are disposed respectively below the branch channels 20 and are free from communicating with the branch channels 20. The collective channels 50 communicate with the generating tubes 41 of the generator sets 40 and each have an opening, such that water discharged from the generating tubes can be discharged into the river again via the collective channels 50.

Preferably, the collective channels 50 can be located at the river banks of the river or pipes connected with the generating tubes 41 of the generator sets 40.

When the hydroelectric generation device in accordance with the present invention is in use, the main gate 13 and the second passage gate 24 are in closed positions, and water will flow into and be stored in the main channel 10 and the two branch channels 20. When a water level of the branch channels 20 is rising to a predetermined level, the water in the branch channels 20 will flow into the containers 31 via the inlet pipes 32.

When the water level of the container 30 is higher than the tops of the generating tube 41, the water inside the container 30 will flow into the generating tube 41 via the connection pipes 42. The water will fall from a position near the top of the generating tube 41 to the open end on the bottom of the generating tube 41. Thus, the falling water will impact the blade wheel assemblies 432 to rotate and to drive the driving shaft 431 to rotate. The generator 433 connected to the driving shaft 431 will be actuated to generate electric power. In addition, the falling water will also drive the waterwheel assembly 441 to rotate and to drive the generator 443 to generate electric power.

Figure 5:
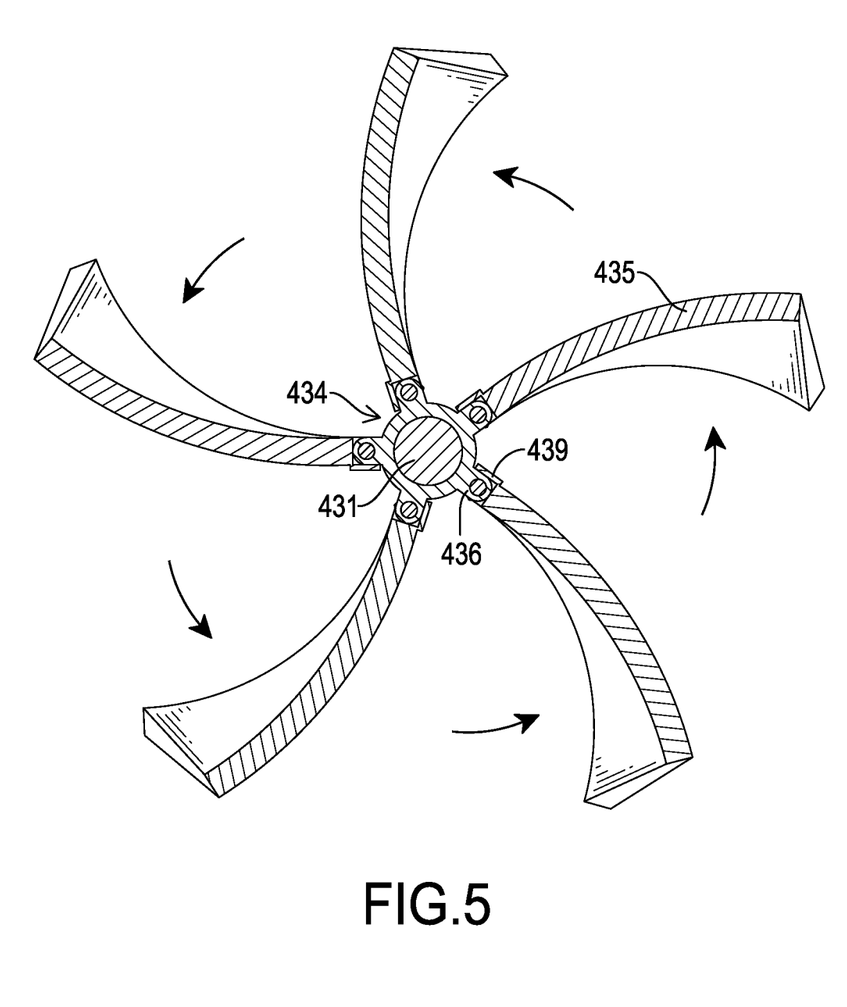
FIG. 5 is an operational cross sectional top view of the blade wheel assembly in FIG. 4.
Figure 6:
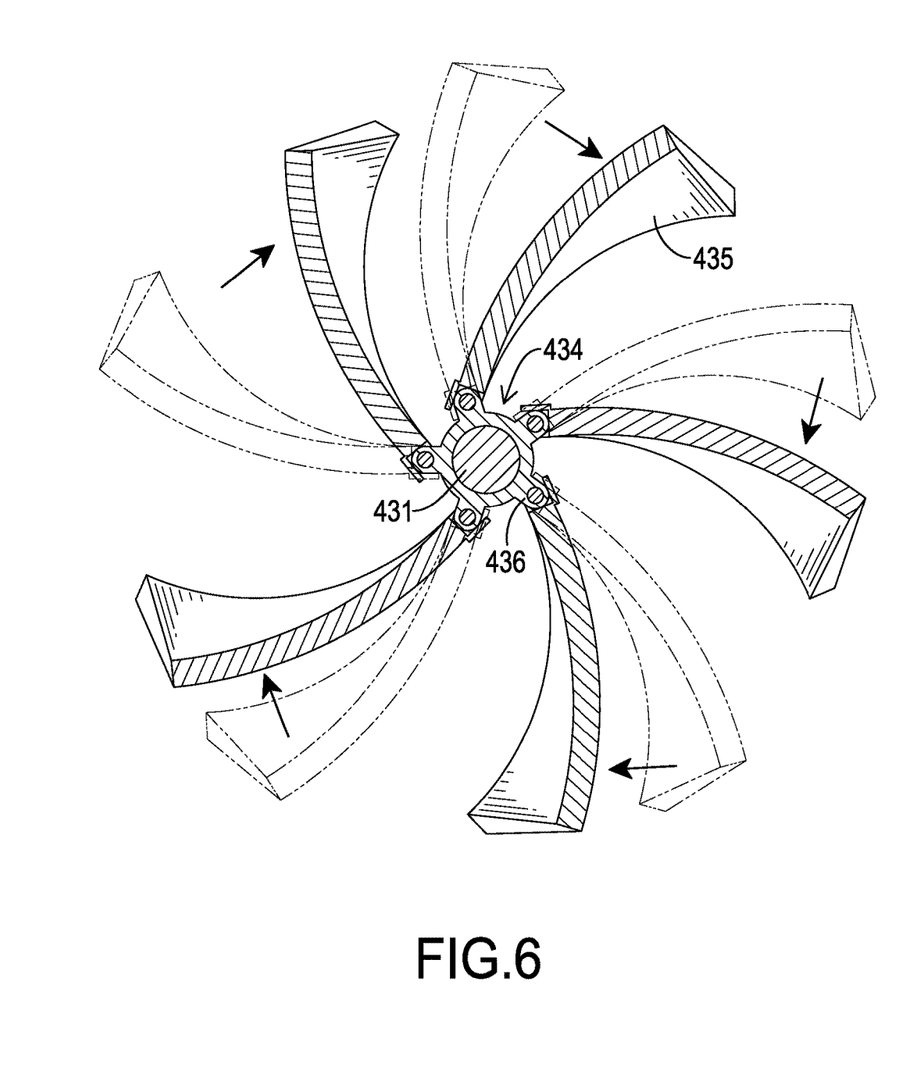
FIG. 6 is another operational cross sectional top view of the blade wheel assembly in FIG. 4.

When water impacts the blades 435 in a positive direction, such as the counterclockwise direction shown in FIG. 5, the abutting plates 439 on the blades 435 and holders 436 of the sleeve 434 will abut against each other. Consequently, the blades 435 will not pivot relative to the sleeve 434 and will propel the sleeve 434. When water impacts the blades 435 in a negative direction, such as the clockwise direction shown in FIG. 6, the blades 435 will be propelled to pivot relative to the sleeve 434, and the sleeve 434 will not be propelled to rotate. Thus, the driving shaft 431 can be prevented from reverse rotation by the water impact from the negative direction.

Finally, the water discharged from the generating tubes 41 will be discharged into the river again via the collective channels 50.

When the hydroelectric generation device in accordance with the present invention is arranged near a large or deep river, a branch can be formed firstly from the river and the hydroelectric generation device is arranged in the branch. Accordingly, the hydroelectric generation device in accordance with the present invention can use the water in the river to generate electric power.

Figure 7:
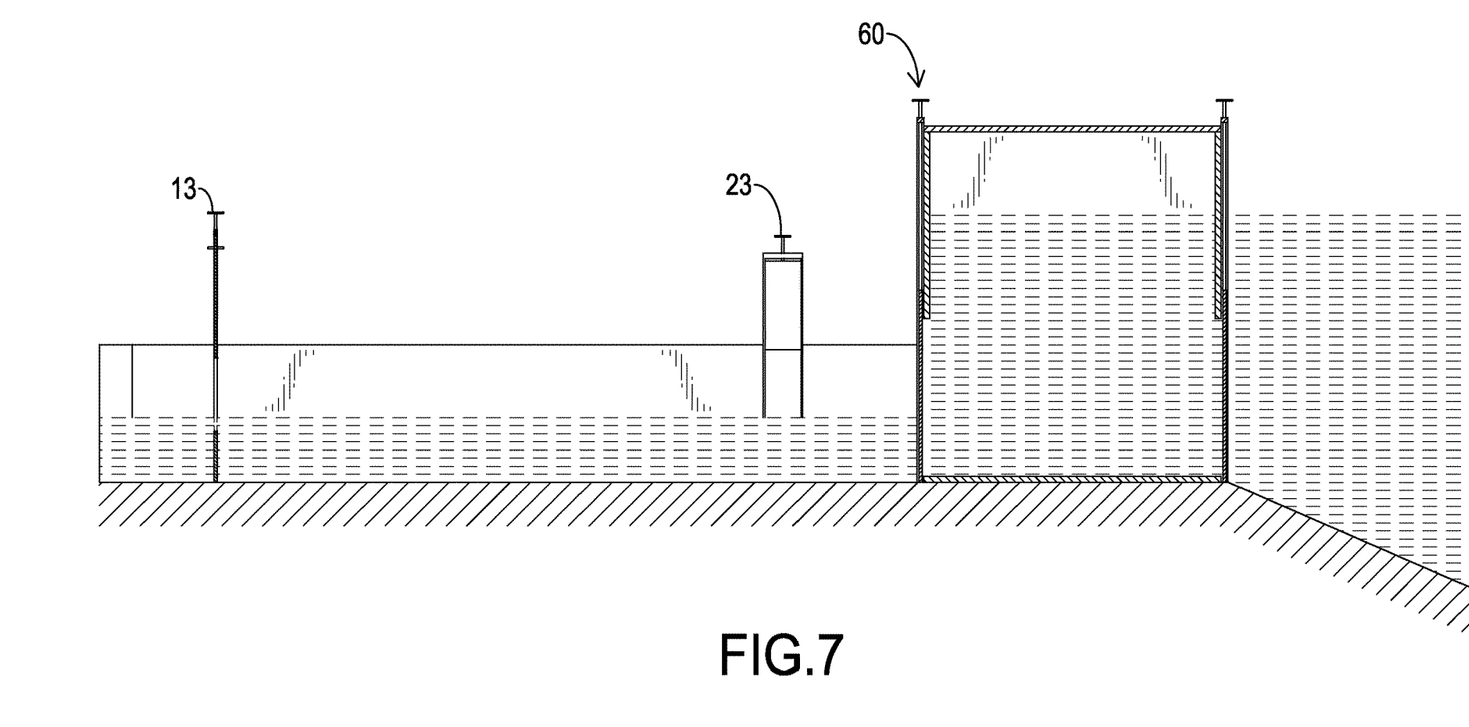
FIG. 7 is an operational side view in partial section of the hydroelectric generation device in FIG. 1 mounted in a sea.

In addition, with reference to FIG. 7, the hydroelectric generation device in accordance with the present invention can also be arranged near a sea, and a storage device 60 is arranged near the sea to store sea water to serve as the water source for the hydroelectric generation device in accordance with the present invention.

The hydroelectric generation device in accordance with the present invention can be adapted to different volumes of water flows, and the volumes of water flow in the main channel 10 and the branch channels 20 can be controlled by the gates 13, 23, 24. The water can be continuously supplied into the generating tubes via the connection pipes 42 due to the siphon principle. Thus, the hydroelectric generation device in accordance with the present invention can continuously generate electric power regardless of changes of the flow rate of the water source. The power generating efficiency will be improved.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hydroelectric generation device comprising:
    a main channel comprising
        a first opening;
        a second opening; and
        a main gate mounted in the second opening to selectively open or close the second opening;
    at least one branch channel communicating with the main channel, and each one of the at least one branch channel comprising
        a first passage communicating with the main channel;
        a second passage;
        a first passage gate mounted in the first passage to selectively open or close the first passage; and
        a second passage gate mounted in the second passage to selectively open or close the second passage;
    at least one storage unit mounted in the at least one branch channel, and each one of the at least one storage unit having
        a container; and
        an inlet pipe having
            a first end connected and communicating with one of the at least one branch channel; and
            a second end connected and communicating with the container, wherein the first end of the inlet pipe is higher than the second end of the inlet pipe; and
    at least one generator set mounted respectively in the at least one storage unit, and each one of the at least one generator set comprising
        a generating tube mounted in the container of a corresponding one of the at least one storage unit and having
            a closed end formed on a top of the generating tube and located at a position near a top of the container of the corresponding storage unit; and
            an open end formed on a bottom of the generating tube;
        at least one connection pipe connected with the generating tube, bent into an inverted L shape, and having
            a top end connected to the generating tube at a position adjacent to the top of the generating tube; and
            a bottom end spaced from a bottom of the container of the corresponding storage unit; and
        a generating unit comprising at least one blade wheel assembly mounted rotatably in the generating tube.

2. The hydroelectric generation device as claimed in claim 1, wherein
    the generating unit of each one of the at least one generator set comprises
        a driving shaft mounted in the generating tube of the generator set; and
        a generator connected to the driving shaft; and
    the at least one blade wheel assembly of the generating unit of each one of the at least one generator set is mounted around the driving shaft of the generating unit, and each one of the at least one blade wheel assembly comprises
        a sleeve fixed around the driving shaft; and
        multiple blades connected to the sleeve in a radial arrangement.

3. The hydroelectric generation device as claimed in claim 2, wherein the sleeve of each one of the at least one blade wheel assembly of each one of the at least one generator set has
    multiple holders protruding from an outer surface of the sleeve, extending longitudinally, and arranged around the sleeve at equiangular intervals, and each holder having a pivoting cavity recessed in the holder; and
    each blade of each one of the at least one blade wheel assembly of each one of the at least one generator set has
        a pivoting portion protruding from an end of the blade and mounted in the pivoting cavity of a respective one of the holders of the sleeve of the blade wheel assembly of the generator set; and
        an abutting plate protruding from the end of the blade and abutting against the respective one of the holders of the sleeve of the blade wheel assembly of the generator set; and
    multiple pivots are respectively inserted through the holders of the sleeve and the pivoting portions of the blades of each one of the at least one blade wheel assembly of each one of the at least one generator set.

4. The hydroelectric generation device as claimed in claim 3, wherein
    the driving shaft of the generating unit of each one of the at least one generator set has an end extending out of the container of a corresponding one of the at least one storage unit; and
    the generator of the generating unit of each one of the at least one generator set is connected to the end the driving shaft of the generating unit.

5. The hydroelectric generation device as claimed in claim 4 further comprising a connective channel communicating with the generating tube of each one of the at least one generator set.

6. The hydroelectric generation device as claimed in claim 3 further comprising a connective channel communicating with the generating tube of each one of the at least one generator set.

7. The hydroelectric generation device as claimed in claim 2, wherein the generating unit of each one of the at least one generator set further comprises a waterwheel generator assembly comprising
    a waterwheel assembly mounted rotatably in the generating tube of the generator set;
    a transmission element connected with the waterwheel assembly; and
    a generator connected with the transmission element and driven by the waterwheel assembly.

8. The hydroelectric generation device as claimed in claim 7 further comprising a connective channel communicating with the generating tube of each one of the at least one generator set.

9. The hydroelectric generation device as claimed in claim 2 further comprising a connective channel communicating with the generating tube of each one of the at least one generator set.

10. The hydroelectric generation device as claimed in claim 1 further comprising a connective channel communicating with the generating tube of each one of the at least one generator set.

* * * * *